United States Patent
Nakagawa et al.

(10) Patent No.: US 8,276,917 B2
(45) Date of Patent: Oct. 2, 2012

(54) SEALING DEVICE

(75) Inventors: Takehiro Nakagawa, Fukushima (JP); Hideharu Hyakutake, Fukushima (JP)

(73) Assignee: NOK Corporation (JP)

( * ) Notice: Subject to any disclaimer, the term of this patent is extended or adjusted under 35 U.S.C. 154(b) by 416 days.

(21) Appl. No.: 12/521,860

(22) PCT Filed: Jan. 24, 2008

(86) PCT No.: PCT/JP2008/050935
§ 371 (c)(1), (2), (4) Date: Jun. 30, 2009

(87) PCT Pub. No.: WO2008/099648
PCT Pub. Date: Aug. 21, 2008

(65) Prior Publication Data
US 2010/0038863 A1 Feb. 18, 2010

(30) Foreign Application Priority Data
Feb. 16, 2007 (JP) .................. 2007-035914

(51) Int. Cl.
*F16J 15/40* (2006.01)
*F01D 11/02* (2006.01)
(52) U.S. Cl. ........................... 277/423; 277/429
(58) Field of Classification Search .............. 277/423, 277/424, 432, 429, 363
See application file for complete search history.

(56) References Cited

U.S. PATENT DOCUMENTS

| | | | | |
|---|---|---|---|---|
| 1,908,956 A * | 5/1933 | Chievitz | ........................ | 384/489 |
| 2,162,486 A * | 6/1939 | Le Tourneau | ................. | 415/110 |
| 2,705,160 A * | 3/1955 | Shafer et al. | .................. | 277/349 |
| 3,021,161 A * | 2/1962 | Rhoads et al. | ................. | 277/568 |
| 3,682,488 A * | 8/1972 | Matsushima | ................. | 277/551 |
| 4,746,128 A * | 5/1988 | Freiwald | ........................ | 277/349 |
| 4,808,012 A * | 2/1989 | Otto | ................................ | 384/482 |
| 4,856,794 A * | 8/1989 | Boyers et al. | ................. | 277/571 |
| 4,913,450 A * | 4/1990 | Asberg | ........................... | 277/346 |
| 4,928,979 A * | 5/1990 | Nagasawa | ..................... | 277/348 |
| 5,022,659 A * | 6/1991 | Otto | ................................ | 277/309 |
| 5,308,087 A * | 5/1994 | Schmitt | ......................... | 277/351 |
| 5,718,436 A * | 2/1998 | Dunford | ........................ | 277/423 |
| 6,293,558 B1 * | 9/2001 | Crapart | ......................... | 277/552 |
| 2009/0224485 A1 * | 9/2009 | Yamanaka et al. | ........... | 277/549 |

FOREIGN PATENT DOCUMENTS

| | | |
|---|---|---|
| JP | 50-18860 U | 3/1975 |
| JP | 54-68055 | 5/1979 |
| JP | 557-93663 * | 6/1982 |

(Continued)

*Primary Examiner* — Thomas Beach
*Assistant Examiner* — Nicholas L Foster
(74) *Attorney, Agent, or Firm* — Harness, Dickey & Pierce, P.L.C.

(57) ABSTRACT

A sealing device in which oil (O) is supplied by ejection to a sealing device body (3). In the sealing device, an increase in friction of a seal lip (33) caused by the pressure of the oil (O) is prevented, and effective lubrication by the oil (O) is promoted. The sealing device has the sealing device body (3) having the seal lip (33) slidably in intimate contact with the outer peripheral surface of a rotating shaft (2), an oil ejection opening (12) for ejecting the oil (O) toward a position on the outer peripheral side of the seal lip (33) of the sealing device body (3), and oil splashing means (4) for splashing the oil (O), ejected from the ejection opening (12), back to a portion near a sliding portion (S) of the seal lip (33).

4 Claims, 7 Drawing Sheets

FOREIGN PATENT DOCUMENTS

| | | |
|---|---|---|
| JP | 60-16055 | 2/1985 |
| JP | 61-118977 U | 7/1986 |
| JP | 1-85570 U | 6/1989 |
| JP | 10-169785 A | 6/1998 |
| JP | 2000-291808 | * 10/2000 |
| JP | 2005-188668 A | 7/2005 |

* cited by examiner

SEALING DEVICE

CROSS-REFERENCE TO RELATED APPLICATIONS

This is a national stage of the International Application No. PCT/JP2008/050935 filed on Jan. 24, 2008 and published in Japanese language.

BACKGROUND OF THE INVENTION

1. Field of the Invention

The present invention relates to a sealing device for sealing between a shaft hole housing and a member such as a shaft or the like at an inner peripheral side thereof by a seal lip, in a motor vehicle, a general machine, an industrial machine or the like, and more particularly to a structure having an oil injection port for injecting oil for lubricating a slide portion of the seal lip.

2. Description of the Conventional Art

As a typical prior art of a sealing device for sealing fluid by a seal lip on an outer periphery of a rotating shaft, for example, structures disclosed Japanese Unexamined Patent Publication No. 2005-188668 and Japanese Unexamined Patent Publication No. 10-169785 are well known.

FIG. 7 is a half sectional view showing a conventional sealing device by cutting along a plane passing through an axis. In this FIG. 7, reference numeral 100 denotes a sealing device (an oil seal). The sealing device 100 is provided with a reinforcing ring 103 having an approximately L-shaped cross section, an attaching portion 101 integrally formed by a rubber-like elastic material on an outer peripheral tube portion of the reinforcing ring 103, and a seal lip 102 integrally formed by a rubber-like elastic material on an inner peripheral portion of the reinforcing ring 103 so as to be directed to an inside space A. The attaching portion 101 is pressure inserted and fixed to an inner peripheral surface of a shaft hole housing 200, and the seal lip 102 is slidably brought into close contact with an outer peripheral surface of a rotating shaft 300, whereby the sealing device seals the inside space A.

In this kind of sealing device, in order to lubricate a sliding portion S between the seal lip 102 and the rotating shaft 300, there is a sealing device structured such as to inject oil O to the sealing device 100 from an oil injection port 201 provided in the shaft hole housing 200. Further, in this case, if the oil O is directly injected toward the sliding portion S, the seal lip 102 is lifted up from an outer peripheral surface of the rotating shaft 300 on the basis of an injecting pressure, and there is a risk that a leakage is caused. Accordingly, the oil O is injected toward a waist portion 104 at an outer peripheral side from the seal lip 102, as illustrated.

However, in this case, if the oil O injected at a pressure about 0.2 MPa from the oil injection port 201 rebounds from the waist portion 104 of the sealing device 100 and hits against the outer peripheral surface of the seal lip 102 strongly, there is a risk of generation of local abrasion of the seal lip 102 caused by a local surface pressure increase of the sliding portion S, and a leakage caused by non-uniformity of surface pressure distribution with respect to a circumferential direction, because a tolerable pressure limit of the sealing device 100 is about 0.03 MPa.

Further, as a countermeasure thereof, there can be considered to improve the tolerable pressure limit (a rigidity) by increasing a thickness of the seal lip 102, however, in this case, it is unavoidable that a tracking performance of the seal lip 102 is deteriorated with respect to an eccentricity of the rotating shaft 300, and a sliding load is increased by an increase of press force applied to the rotating shaft 300. As a result, there is a risk of deterioration of a rubber material caused by an increase of sliding heat generation, an increase of a friction torque, early abrasion of the seal lip 102 and the like.

SUMMARY OF THE INVENTION

Problem to be Solved by the Invention

The present invention is made by taking the point mentioned above into consideration, and a technical object of the present invention is to prevent abrasion of a seal lip from being increased by pressure of oil and promote an effective lubricating action performed by the oil, in a sealing device in which the oil is injected and supplied for lubricating a sliding portion between the seal lip and a rotating shaft.

Means for Solving the Problem

As a means for effectively solving the technical object mentioned above, in accordance with the present invention, there is provided a sealing device comprising:

a sealing device main body having a seal lip which is slidably brought into close contact with an outer peripheral surface of a rotating shaft; and an oil injection port for injecting oil to a position at to an outer peripheral side from the seal lip in the sealing device main body, wherein the sealing device is provided with an oil scattering means for rebounding the oil injected from the oil injection port to a portion in the vicinity of a sliding portion of the seal lip so as to scatter it. In other words, the present invention prevents a sliding surface pressure from being increased due to collision of the oil against the outer peripheral surface of the seal lip, by rebounding the oil injected from the oil injection port to the portion in the vicinity of the sliding portion of the seal lip so as to scatter, and is structured such that good lubrication of the sliding portion can be carried out by the oil scattered to the portion in the vicinity of the sliding portion of the seal lip.

In a preferable example of the sealing device in accordance with the present invention, the oil scattering means is constituted by a plate having a plate main body portion which is positioned at the oil injection port side from the seal lip, and an inner peripheral edge of the plate main body portion comes into collision with the oil injected from the oil injection port so as to rebound the oil to the portion in the vicinity of the sliding portion of the seal lip and scatter it. In accordance with this structure, it is possible to prevent the oil injected from the oil injection port from rebounding onto the outer peripheral surface of the seal lip and it is possible to securely scatter the oil to the portion in the vicinity of the sliding portion.

In another preferable example of the sealing device in accordance with the present invention, the oil scattering means is constituted by a plate which is integrally fitted and attached to the sealing device main body, and the plate has a protruding portion for guiding a direction of scatter caused by the collision of the oil injected from the oil injection port in such a manner that the oil jumps beyond the outer peripheral side of the seal lip. In this case, it is possible on prevent the oil injected from the oil injection port from rebounding onto the outer peripheral surface of the seal lip and it is possible to securely scatter the oil to the portion in the vicinity of the sliding portion.

In further another preferable example of the sealing device in accordance with the present invention, the oil scattering means is constituted by a plate which is integrally fitted and attached to the sealing device main body, and the plate is formed in such a bent shape as to come into collision at plural times with the oil injected from the oil injection port to rebound the oil. In accordance with this structure, since a collision pressure of the oil is lowered and the oil becomes in a splash state, in the process that the oil rebounds at a plurality of times, it is possible to prevent the oil from coming into strong collision with the outer peripheral surface of the seal lip and it is possible to scatter the oil to the portion in the vicinity of the sliding portion.

In further another preferable example of the sealing device in accordance with the present invention, the oil scattering means is constituted by a disc-shaped slinger which rotates together with the rotating shaft, and the slinger is provided with a plurality of holes which are arranged in a circumferential direction at radial positions where the oil injected from the oil injection port comes into collision. In accordance with this structure, since the oil is injected to the sealing device side through the holes only at a time when the holes pass through the front of the oil injection port in accordance with the rotation of the slinger, and the oil is scattered by the collision with inner surfaces of the holes at that time, it is possible to reduce the collision pressure of the oil with respect to the outer peripheral surface of the seal lip, and it is possible to effectively scatter the oil to the portion in the vicinity of the sliding portion.

In further another preferable example of the sealing device in accordance with the present invention, the oil scattering means is integrally formed by a rubber-like elastic material, which is continuously provided with the seal lip, in the sealing device main body, and is constituted by an elastic protruding portion having an inclined surface for rebounding the oil injected from the oil injection port to the outer peripheral side. In this case, since kinetic energy of the oil is attenuated at a time when the oil comes into collision with the inclined surface of the elastic protruding portion, it is possible to prevent the oil from coming into strong collision with the outer peripheral surface of the seal lip, and it is possible to securely scatter the oil to the portion in the vicinity of the sliding portion. Further, since the oil scattering means is formed in the sealing device main body so as to be continuous with the seal lip, increase of parts number and manufacturing process is not caused.

Effect of the Invention

In accordance with the sealing device on the basis of the present invention, since the oil injected from the oil injection port is scattered to the portion in the vicinity of the sliding portion of the seal lip, by the oil scattering means, it is possible to prevent a lift and biased abrasion of the seal lip due to the pressure of the injected oil, and it is possible to secure an effective lubricating action by the oil.

DETAILED DESCRIPTION OF PREFERRED EMBODIMENT

A description will be given below of a preferable embodiment of a sealing device in accordance with the present invention with reference to the accompanying drawings. First, FIG. 1 is a half sectional view showing a first embodiment of a sealing device in accordance with the present invention by cutting along a plane passing through an axis.

Figure 1:
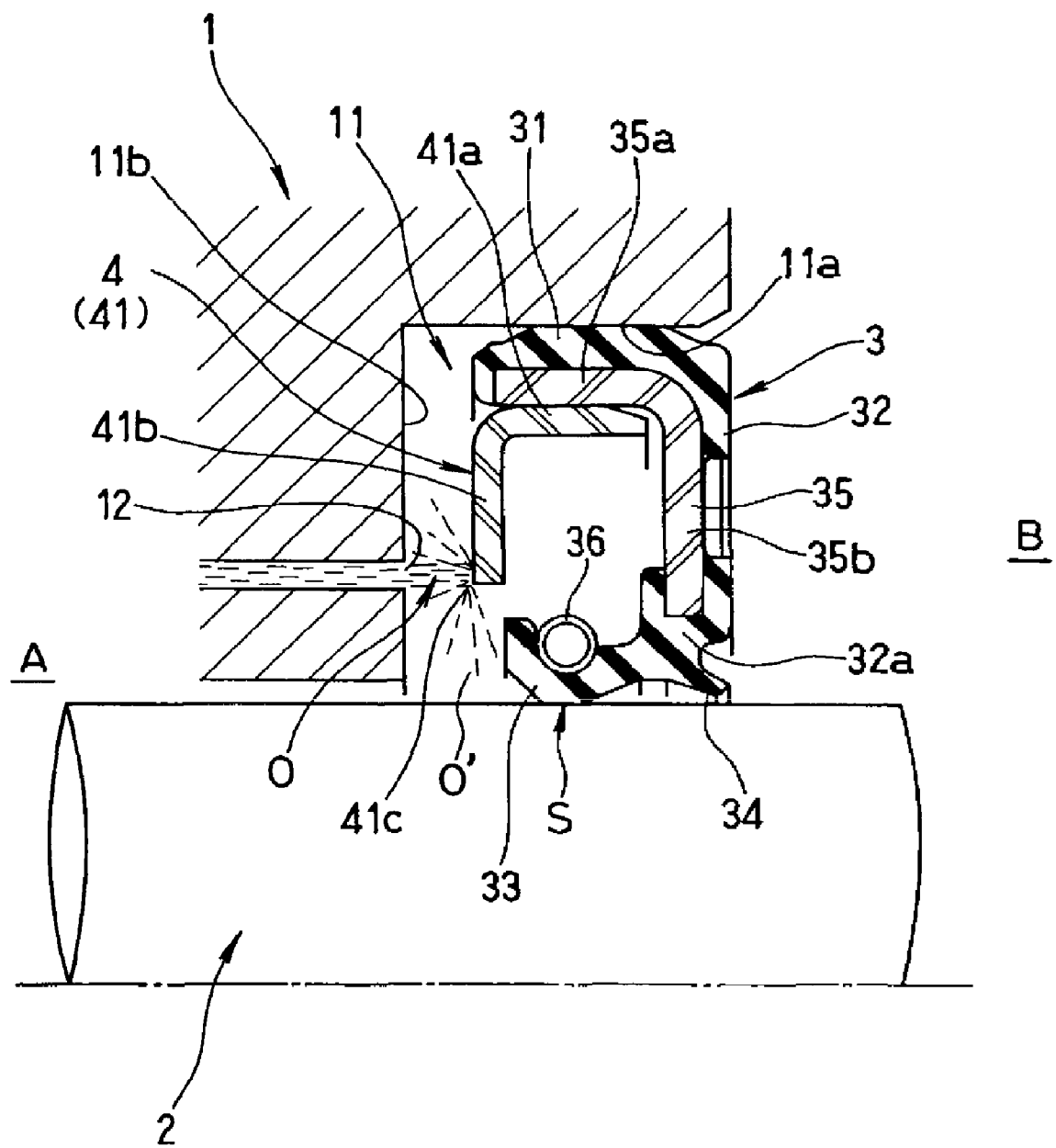
FIG. 1 is a half sectional view showing a first embodiment of a sealing device in accordance with the present invention by cutting along a plane passing through an axis.

In FIG. 1, reference numeral 1 denotes a shaft hole housing of an equipment, and reference numeral 2 denotes a rotating shaft having an approximately horizontal axis and inserted to an inner periphery of the shaft hole housing 1. In other words, the rotating shaft 2 is rotated around the approximately horizontal axis, and a sealing device main body 3 is installed in a seal installation concave portion 11 formed at an inner periphery of an end portion of the shaft hole housing 1.

The sealing device main body 3 is integrally formed on a reinforcing ring 35 by a rubber-like elastic material. In other words, the sealing device main body 3 has an approximately cylindrical attaching portion 31, a radial portion 32 extending to an inner peripheral side from an end portion thereof at an outside space B side, a seal lip 33 extending toward an inside space A side from a waist portion 32a at an inner periphery of the radial portion 32 in such a manner as to form an approximately C-shaped cross section together with the attaching portion 31 and the radial portion 32, a dust lip 34 extending toward an opposite side to the seal lip 33 (the outside space B side) from an inner peripheral end of the waist portion 32a, a metal reinforcing ring 35 embedded over the attaching portion 31 and the radial portion 32, and an extension spring 36 fitted and attached to an outer periphery of the seal lip 33.

The reinforcing ring 35 is manufactured by press forming of a metal plate, is constituted by a cylinder portion 35a embedded in the attaching portion 31 and an inward collar portion 35b embedded in the radial portion 32, and has an approximately L-shaped cross section. The attaching portion 31 is a portion which is pressure inserted and closely fitted to an inner peripheral surface 11a of the seal installation concave portion 11 of the housing 1, and is structured such as to be previously compressed suitably in a radial direction, in the installation state, between the cylinder portion 35a of the reinforcing ring 35 and the inner peripheral surface 11a of the seal installation concave portion 11.

An inner peripheral portion provided to have an approximately V-shaped cross section in the vicinity of an end of the seal lip 33 is structured such as to be slidably brought into close contact with an outer peripheral surface of the rotating shaft 2 with a suitable fastening margin. On the other hand, an inner peripheral edge of the dust lip 34 directed to an opposite side to the seal lip 33 comes close to an outer peripheral surface of the rotating shaft 2 with a minute gap, or is slidably brought into close contact therewith a slight fastening margin.

The extension spring 36 is structured by connecting a metal coil spring in an annular shape, is fitted and attached to an annular groove formed in an outer peripheral surface of the seal lip 33, and compensates tension force of the seal lip 33 with respect to an outer peripheral surface of the rotating shaft 2.

The housing 1 is provided with an oil injection port 12 for injecting oil O for lubricating a sliding portion S between an inner peripheral portion of the seal lip 33 and the outer peripheral surface of the rotating shaft 2, for example, so as to be positioned at an upper side of the rotating shaft 2, and the oil injection port 12 is open in a rising surface 11b of the seal installation concave portion 11 of the housing 1, at a radial position to an outer periphery side from the seal lip 33.

An oil scattering means 4 is attached to the sealing device main body 3. The oil scattering means 4 is constructed by a plate 41 manufactured by press forming or the like of a metal plate, and is provided with a pressure insertion tube portion 41a which is pressure inserted and fitted to an inner peripheral surface of the cylinder portion 35a of the reinforcing ring 35 in the sealing device main body 3, and a plate main body portion 41b extending to an inner peripheral side from an end portion thereof at the inside space A side. The plate main body portion 41b is positioned slightly to the inside space A side from an end position of the seal lip 33, and an inner peripheral edge 41c thereof is positioned approximately in front of an opening portion of the oil injection port 12.

In the sealing device in accordance with the first embodiment structured as mentioned above, since the attaching portion 31 is pressure inserted and fitted to the inner peripheral surface 11a of the seal installation concave portion 11 of the housing 1 in such a manner that the seal lip 33 is directed to the inside space A side, and the inner peripheral portion of the seal lip 33 is slidably brought into close contact with the outer peripheral surface of the rotating shaft 2, the sealing device main body 3 is made so as to prevent an oil to be sealed, for example, in a mist state, existing in the inside space A from leaking to an atmospheric air side of the outside space B from a shaft periphery. In addition, the dust lip 34 prevents a foreign material in the outside space B from making an intrusion.

As mentioned above, for example, in the case that the oil to be sealed exists in the mist state in the inside space A, a good lubricating oil film is hard to be formed at the sliding portion S of the seal lip 33 with respect to the outer peripheral surface of the rotating shaft 2. Accordingly, the oil O for lubricating the sliding portion S is injected approximately horizontally into the seal installation concave portion 11 from the oil injection port 12 provided in the housing 1 at a pressure about 0.2 MPa. Then, the oil O is scattered in a mist state by coming into collision with the inner peripheral edge 41c of the plate main body portion 41b in the plate 41 positioned in front of the oil injection port 12, and a part O' thereof is scattered toward a front side of the sliding portion S of the seal lip 33.

For example, in the case that the plate main body portion 41b extends to the inner peripheral side from the oil injection port 12, the oil O injected from the oil injection port 12 is rebounded by the plate main body portion 41b completely. However, since the oil O coming into collision with the inner peripheral edge 41c is scattered at random by positioning the inner peripheral edge 41c of the plate main body portion 41b approximately in front of the opening portion of the oil injection port 12, as in the embodiment shown in FIG. 1, the part O' thereof tends to fly to the portion in the vicinity of the sliding portion S of the seal lip 33. Accordingly, it is possible to prevent the rebounded oil O from coming into strong collision with the outer peripheral surface of the seal lip 33, and it is possible to urge formation of a good lubricating oil film at the sliding portion S.

Figure 2:
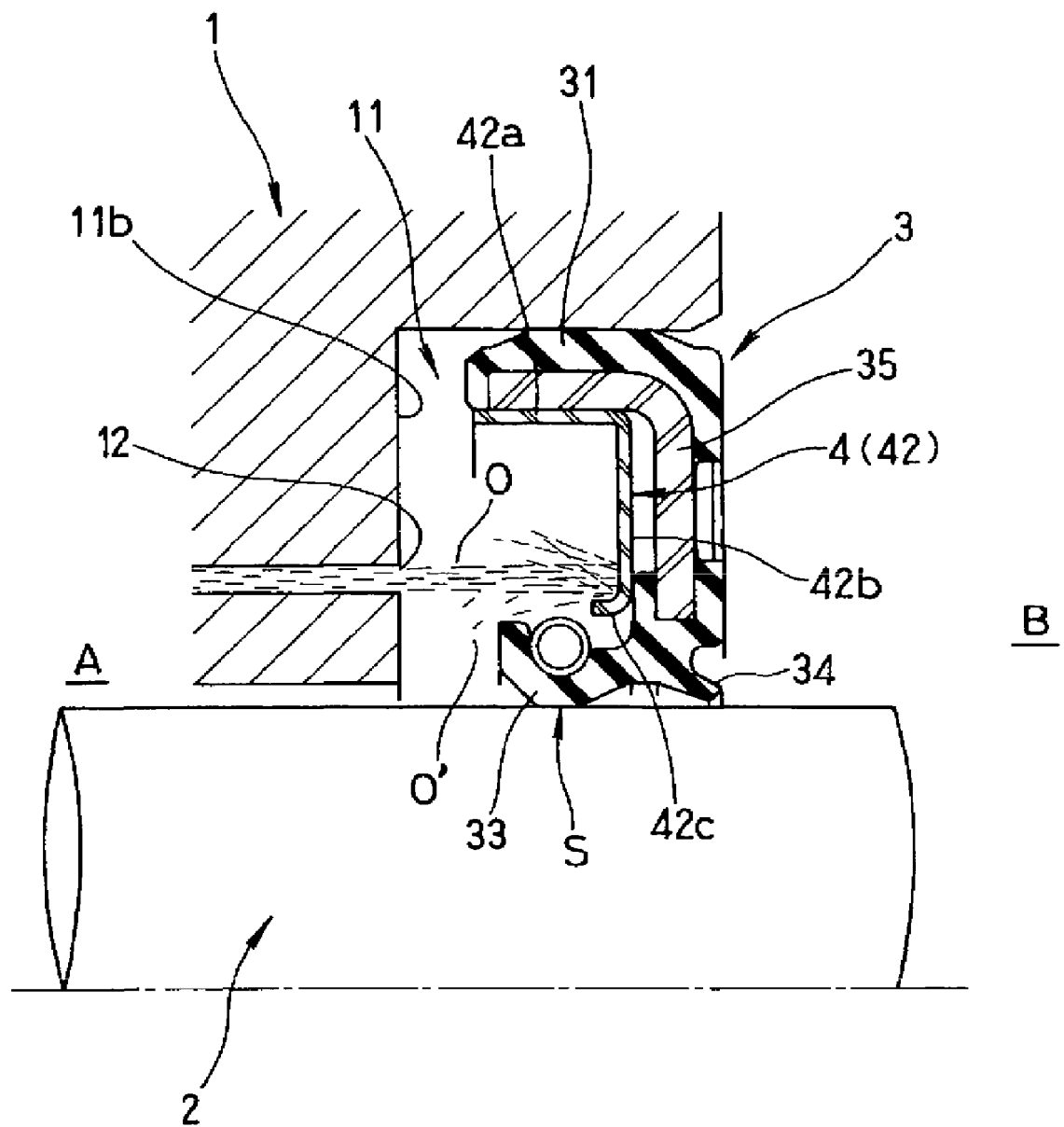
FIG. 2 is a half sectional view showing a second embodiment of a sealing device in accordance with the present invention by cutting along a plane passing through an axis.

Next, FIG. 2 is a half sectional view showing a second embodiment of the sealing device in accordance with the present invention by cutting along a plane passing through an axis. The sealing device in accordance with the second embodiment is different from the first embodiment mentioned above in the shape of a plate 42 serving as the oil scattering means 4.

In detail, the plate 42 is manufactured by press forming or the like of a metal plate, and is provided with a pressure insertion tube portion 42a pressure inserted and fitted to an inner peripheral surface of the cylinder portion 35a of the reinforcing ring 35 in the sealing device main body 3, a plate main body portion 42b extending to an inner peripheral side along the inward collar portion 35b of the reinforcing ring 35 from an end portion at an opposite side to the inside space A in the pressure insertion tube portion 42a, and a protruding portion 42c bent toward the inside space A side from an inner peripheral end thereof. The protruding portion 42c is structured such as to guide the scattering direction of the oil O injected from the oil injection port 12 to come into collision with the plate main body portion 42b so as to jump beyond the outer peripheral side of the seal lip 33, and is positioned at an inner periphery side (a lower side) of the colliding position of the oil O and an outer peripheral side (an upper side) of the seal lip 33.

In this case, the structures of the other portions such as the sealing device main body 3 and the like are basically the same as those of the first embodiment described above.

In the sealing device in accordance with the second embodiment structured as mentioned above, the sealing device main body 3 has the same sealing function as that of the first embodiment. Further, when the oil O for lubricating the sliding portion S of the seal lip 33 is injected into the seal installation concave portion 11 from the oil injection port 12 of the housing 1 at a pressure about 0.2 MPa, the oil O becomes in a mist state by coming into collision with an inner peripheral portion of the plate main body portion 42b of the plate 42 at the outer peripheral side (the upper side) of the seal lip 33 so as to be scattered, and the scattering direction is guided so as to jump beyond the outer peripheral side of the seal lip 33 by the protruding portion 42c.

Accordingly, it is possible to effectively prevent the oil O rebounded by the plate main body portion 42b from coming into strong collision with the outer peripheral surface of the seal lip 33, and the part O' of the scattered oil splash is supplied to the front side of the sliding portion S while jumping beyond the outer peripheral side of the seal lip 33, whereby it is possible to urge formation of a good lubricating oil film at the sliding portion S.

Figure 3:
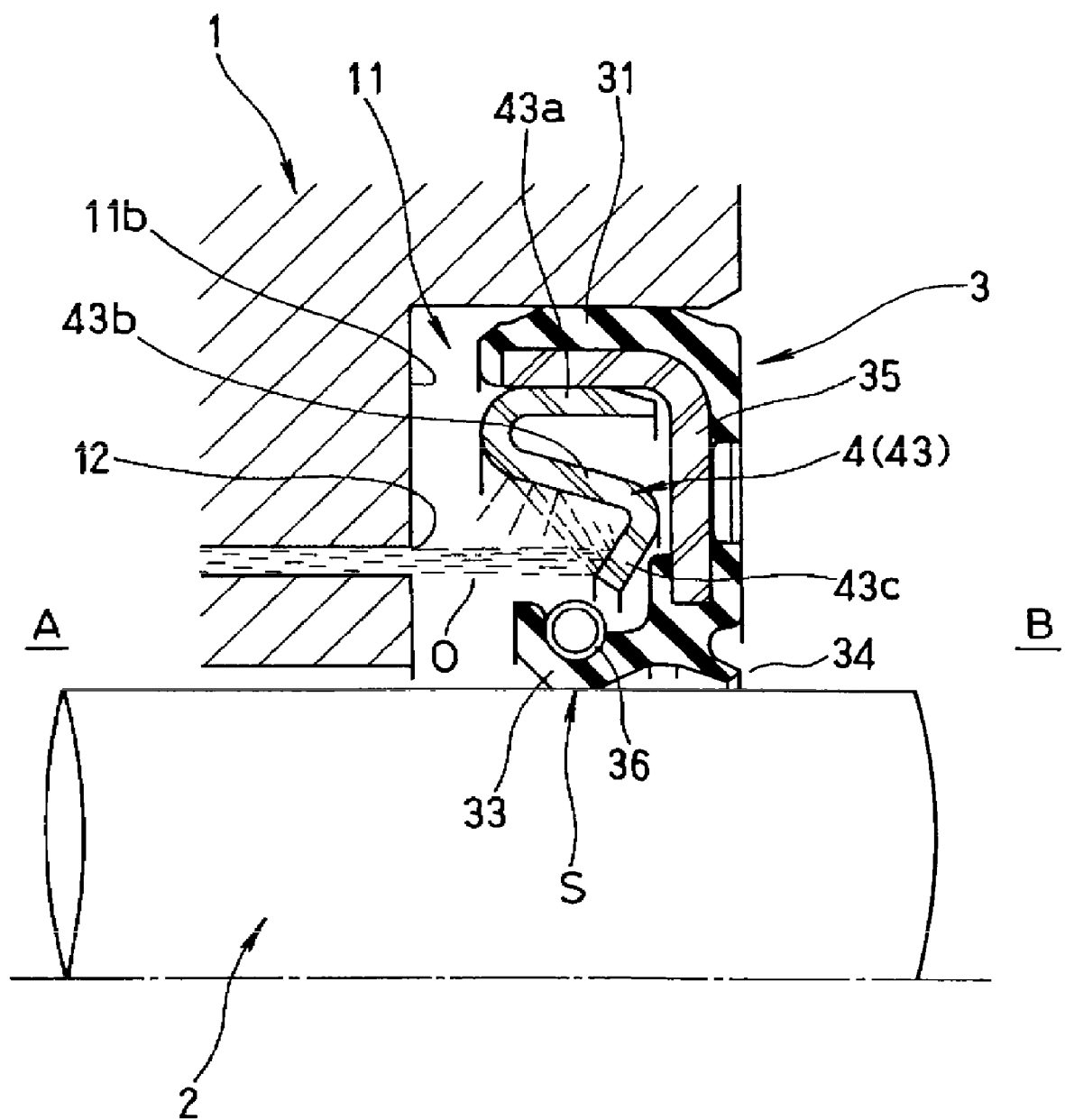
FIG. 3 is a half sectional view showing a third embodiment of a sealing device in accordance with the present invention by cutting along a plane passing through an axis.

Next, FIG. 3 is a half sectional view showing a third embodiment of the sealing device in accordance with the present invention by cutting along a plane passing through an axis. The sealing device in accordance with the third embodiment is different from the first and second embodiments mentioned above in the shape of a plate 43 serving as the oil scattering means 4.

In detail, the plate 43 is manufactured by press forming or the like of a metal plate, and is provided with a pressure insertion tube portion 43a pressure inserted and fitted to an inner peripheral surface of the cylinder portion 35a of the reinforcing ring 35 in the sealing device main body 3, an intermediate conical tube portion 43b bent from an end portion at the inside space A side of the pressure insertion tube portion 43a so as to become smaller in diameter little by little toward an opposite side to the inside space A, and an inner peripheral conical tube portion 43c bent at the small diameter end portion thereof so as to become smaller in diameter little by little toward the inside space A side. The inner peripheral conical tube portion 43c exists at a radial position with which the oil O injected from the oil injection port 12 comes into collision, and an angle of incline thereof is set in such a manner that the oil O rebounded by the collision comes into collision with the intermediate conical tube portion 43b.

In this case, the structures of the other portions such as the sealing device main body 3 and the like are basically the same as those of the first and second embodiments described above.

In the sealing device in accordance with the third embodiment structured as mentioned above, the sealing device main body 3 has the same sealing function as that of the first and second embodiments. Further, when the oil O for lubricating the sliding portion S of the seal lip 33 is injected into the seal installation concave portion 11 from the oil injection port 12 provided in the housing 1 at a pressure about 0.2 MPa, the oil O is rebounded diagonally toward the outer peripheral side (the upper side) by coming into collision with the inner peripheral conical tube portion 43c of the plate 43 at the outer peripheral side (the upper side) of the seal lip 33, next comes into collision with the intermediate conical tube portion 43b, and is scattered to the inner peripheral side (the lower side) toward the portion in the vicinity of the sliding portion S of the seal lip 33.

Further, since kinetic energy of the oil O is attenuated and the oil becomes the mist on the basis of the repeated collision as mentioned above, the oil O does not come into strong collision with the outer peripheral surface of the seal lip 33, but is scattered to the portion in the vicinity of the sliding portion S of the seal lip 33, whereby it is possible to urge formation of the good lubricating oil film at this sliding portion S.

Figure 4:
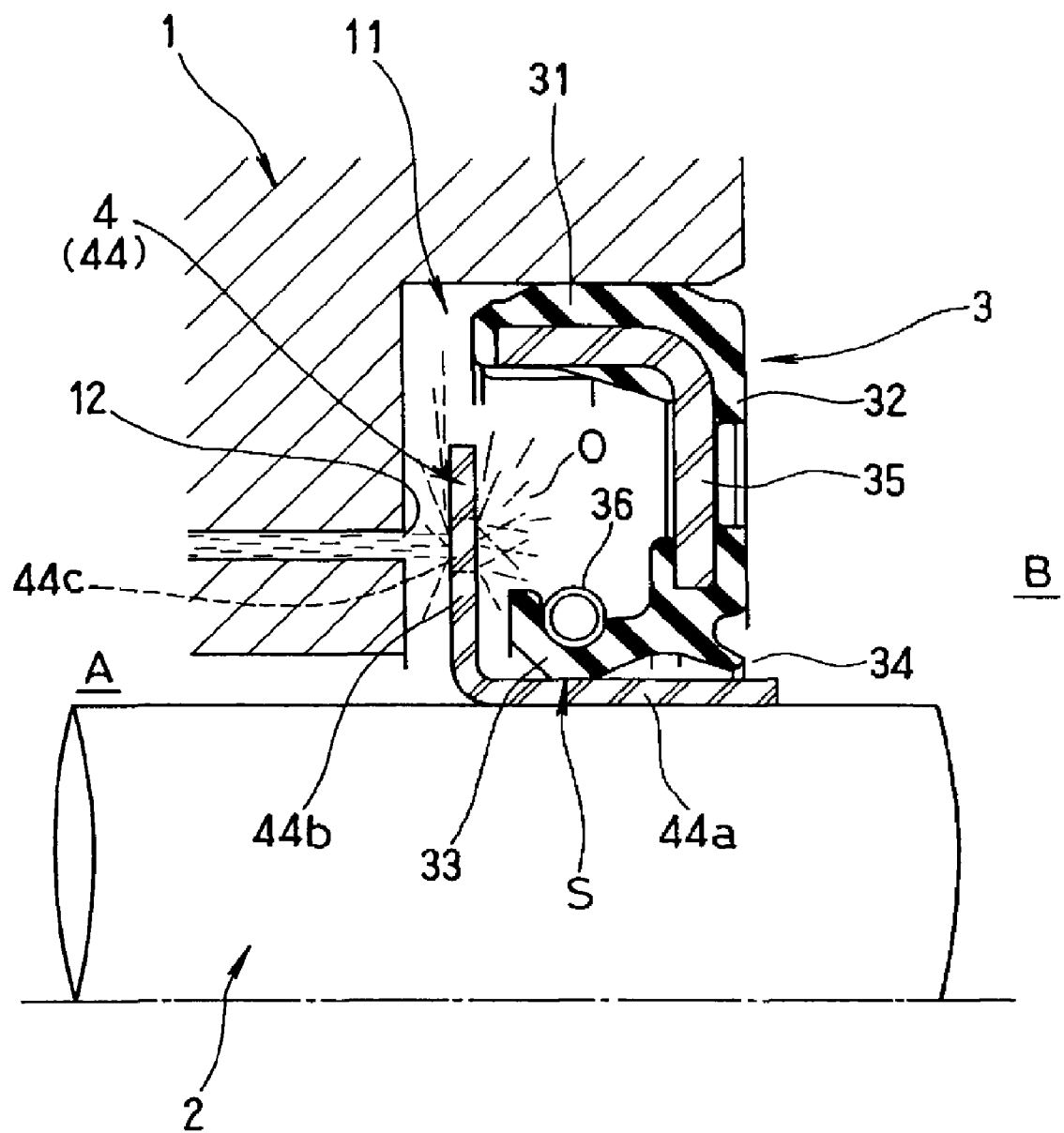
FIG. 4 is a half sectional view showing a fourth embodiment of a sealing device in accordance with the present invention by cutting along a plane passing through an axis.
Figure 5:
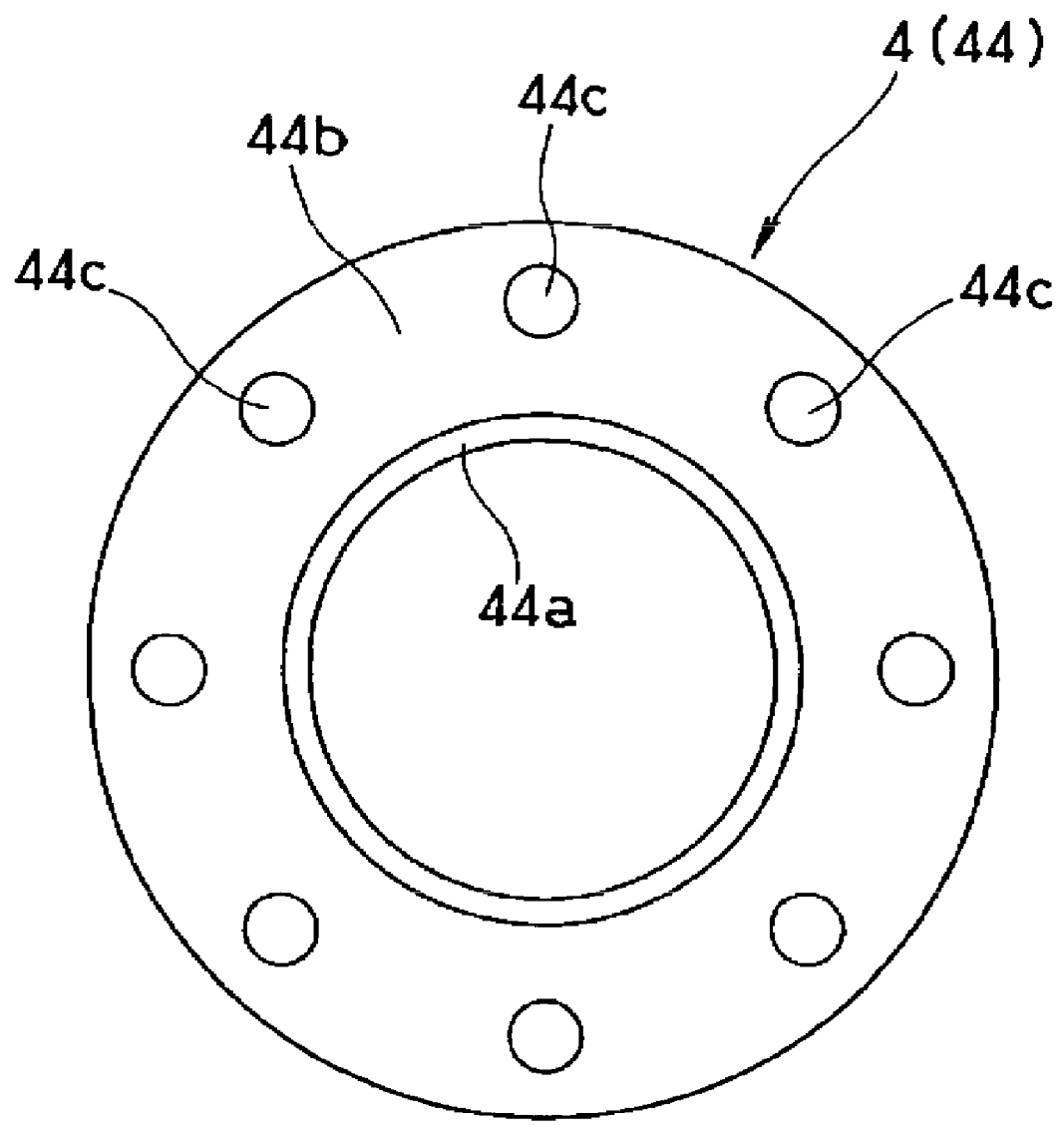
FIG. 5 is a view of a slinger in the fourth embodiment as seen in a direction in parallel to the axis.

Next, FIG. 4 is a half sectional view showing a fourth embodiment of the sealing device in accordance with the present invention by cutting along a plane passing through an axis, and FIG. 5 is a view of a slinger 44 in the fourth embodiment as seen in a direction in parallel to an axis. In other words, the sealing device in accordance with the fourth embodiment is different from the first to third embodiments mentioned above in a point that the slinger 44 is used as the oil scattering means 4.

In detail, the slinger 44 is manufactured by press punching or the like of a metal plate, and is provided with a sleeve 44a which is pressure inserted and fitted to the outer peripheral surface of the rotating shaft 2, and a slinger main body 44b which expands in a disc shape to an outer peripheral side from an end portion at the inside space A side of in the sleeve 44a, and a plurality of circular holes 44c are provided at in a predetermined interval in a circumferential direction, at radial positions with which the oil O injected from the oil injection port 12 of the housing 1 comes into collision, in the slinger main body 44b, as shown in FIG. 5.

Further, as shown in FIG. 4, the inner peripheral portion (the sliding portion S) of the seal lip 33 in the sealing device main body 3 is slidably brought into close contact with the outer peripheral surface of the sleeve 44a of the slinger 44, and an inner peripheral edge of the dust lip 34 comes close to the outer peripheral surface of the sleeve 44a with a minute gap, or is slidably brought into close contact therewith a slight fastening margin.

In this case, the structures of the other portions such as the sealing device main body 3 and the like are basically the same as those of the first to third embodiments described above.

In the sealing device in accordance with the fourth embodiment structured as mentioned above, the sealing device main body 3 has the same sealing function as that of the first to third embodiments. Further, when the oil O for lubricating the sliding portion S of the seal lip 33 is injected into the seal installation concave portion 11 from the oil injection port 12 provided in the housing 1 at the pressure about 0.2 MPa, there are alternately generated the scattering to the front face side caused by the collision of the oil O against the slinger main body 44b, and the scattering to the back face side of the slinger main body 44b caused by the pass of the oil O through the holes 44c, at the destination of the injection, because the slinger main body 44b of the slinger 44 rotates together with the rotating shaft 2 and the holes 44c provided in the slinger main body 44b pass one after the other in the circumferential direction.

Accordingly, a passing amount of the oil O to the back face side of the slinger main body 44b, at which the seal lip 33 exists, is limited, and the scattering in random directions is generated by interference with inner surfaces of the holes 44c, when the oil O passes through the holes 44c moving one after the other in the rotating direction on the basis of the rotation of the slinger 44. Accordingly, a collision pressure of the oil O against the outer peripheral surface of the seal lip 33 is diminished, and it is possible to urge formation of a good lubricating oil film at the sliding portion S between the seal lip 33 and the sleeve 44a of the slinger 44.

Further, since it takes a longer time for the holes 44c to pass through the front of the oil injection port 12 in the rotating direction, at a time of a low speed rotation, the scattering effect with respect to the oil O becomes smaller at that degree. However, for example, in the case of an engine for a motor vehicle, the injection pressure of the oil O changes in proportion to a revolutional speed of an engine (a rotating speed of the rotating shaft 2). In other words, since the injection pressure itself of the oil O becomes low at a time of the low speed rotation, no problem is generated even if the oil O passing through the holes 44c is rebounded onto the outer peripheral surface of the seal lip 33.

Figure 6:
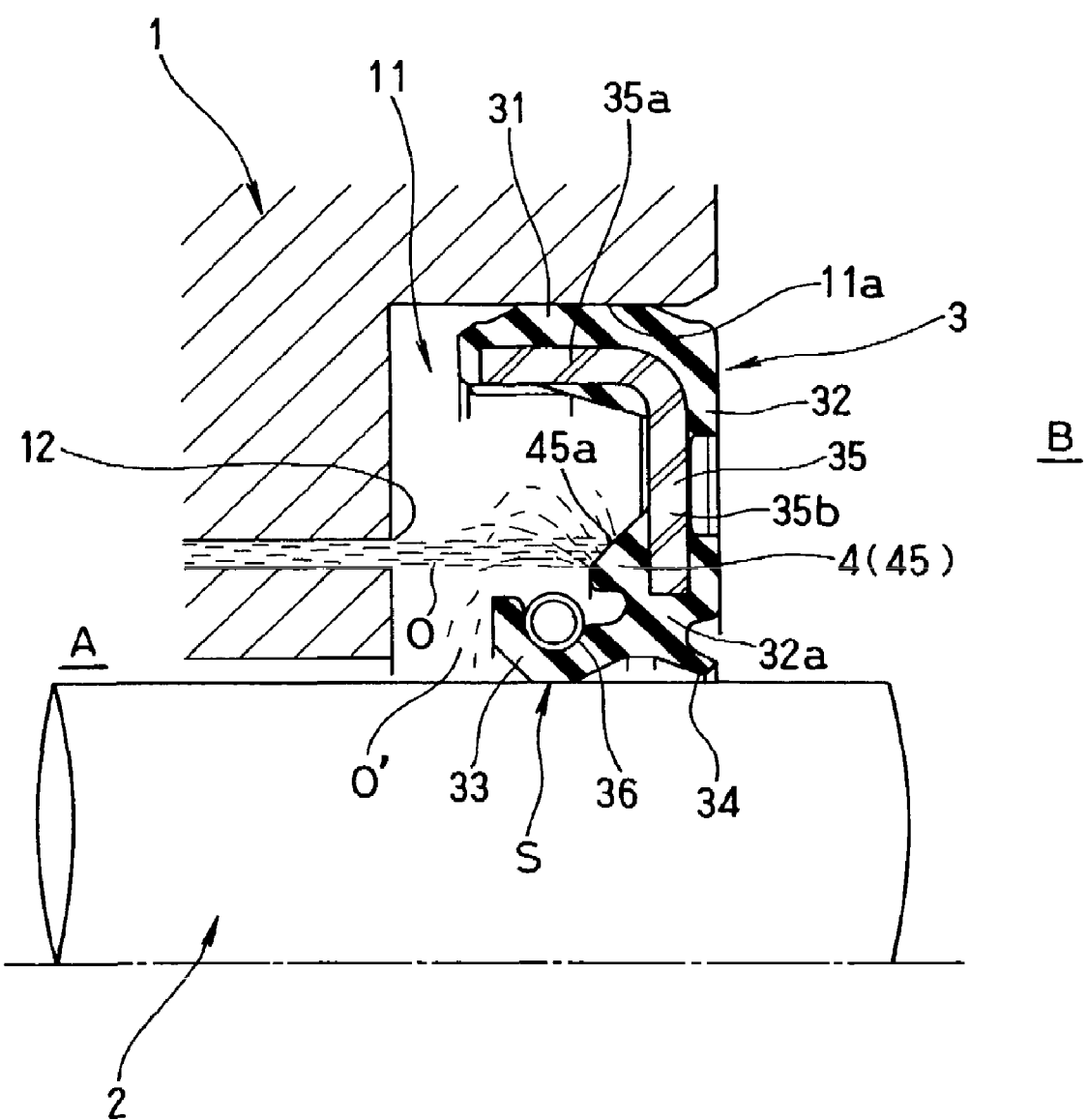
FIG. 6 is a half sectional view showing a fifth embodiment of a sealing device in accordance with the present invention by cutting along a plane passing through an axis.
Figure 7:
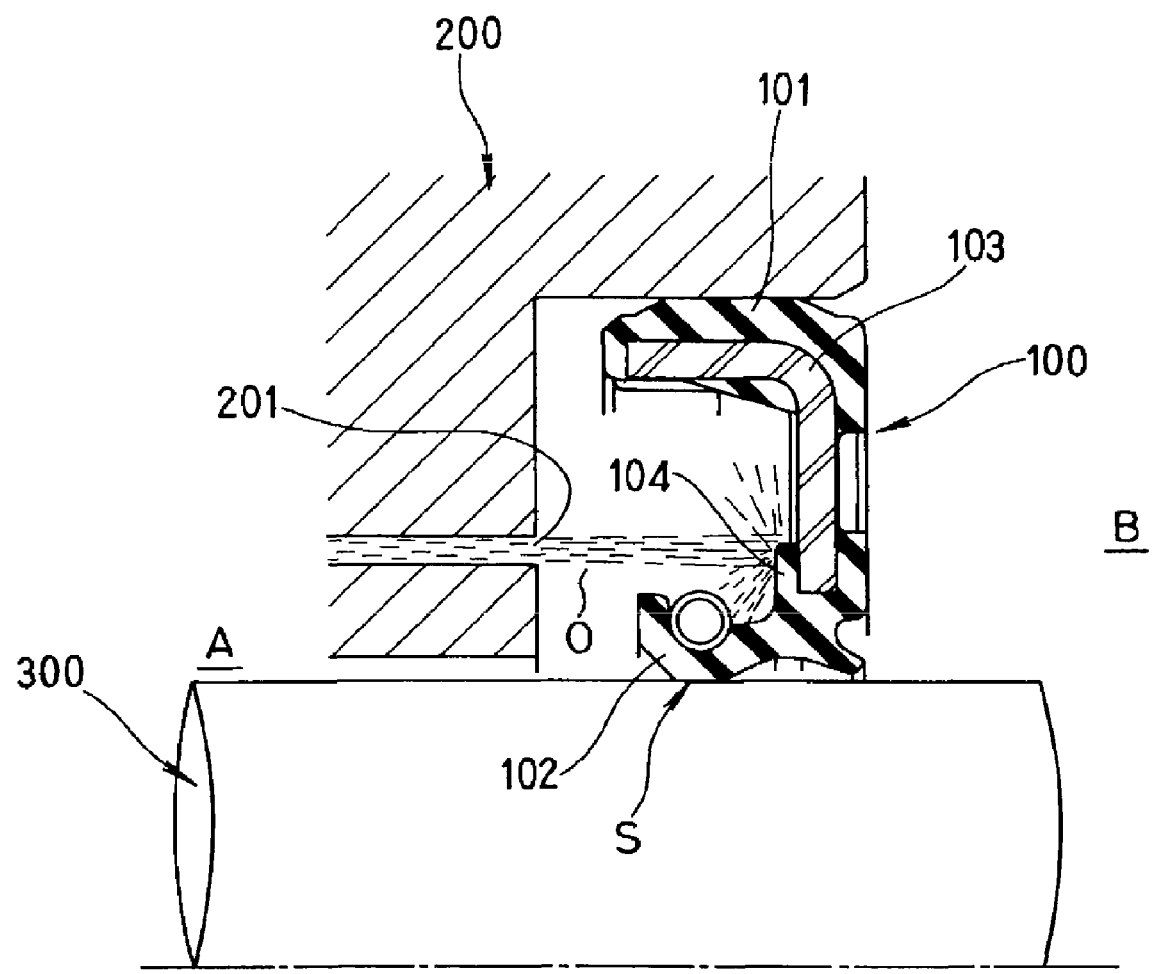
FIG. 7 is a half sectional view showing a conventional sealing device by cutting along a plane passing through an axis.

Next, FIG. 6 is a half sectional view showing a fifth embodiment of the sealing device in accordance with the present invention by cutting along a plane passing through an axis. The sealing device in accordance with the fifth embodiment is different from the first to fourth embodiments mentioned above in a point that the oil scattering means 4 is integrally formed in the sealing device main body 3 by a rubber-like elastic material which is provided continuously with the seal lip 33.

In detail, the sealing device main body 3 is basically provided with the same structure as that of each of the embodiments mentioned above. In other words, the sealing device main body 3 has the approximately cylindrical attaching portion 31 which is integrally formed on the metal reinforcing ring 35 by a rubber-like elastic material, the radial portion 32 extending to the inner peripheral side from the end portion at the outside space B side, the seal lip 33 extending toward the inside space A side from the waist portion 32a at the inner periphery of the radial portion 32 in such a manner as to form the approximately C-shaped cross section together with the attaching portion 31 and the radial portion 32, the dust lip 34 extending toward the opposite side (the outside space B side) to the seal lip 33 from the inner peripheral end of the waist portion 32a, a reinforcing ring 35 embedded over the attaching portion 31 and the radial portion 32 and having an approximately L-shaped cross section, and the extension spring 36 fitted and attached to the outer periphery of the seal lip 33.

An elastic protruding portion 45 which is provided continuously from the seal lip 33 and is made of a rubber-like elastic material is integrally provided as the oil scattering means 4 on a front face side of the inward collar portion 35b of the reinforcing ring 35, and a front face of the elastic protruding portion 45 is formed as an inclined surface 45a directed to an outer peripheral side (an upper side) in such a manner that an axial height of the elastic protruding portion 45 increases toward the inner peripheral side.

In the sealing device in accordance with the fifth embodiment structured as mentioned above, the sealing device main body 3 has the same sealing function as those of the first to fourth embodiments. Further, when the oil O for lubricating the sliding portion S of the seal lip 33 is injected into the seal installation concave portion 11 from the oil injection port 12 provided in the housing 1 at the pressure about 0.2 MPa, the oil O is rebounded diagonally toward the outer peripheral side (the upper side) by coming into collision with the inclined surface 45a of the elastic protruding portion 45 made of the rubber-like elastic material at the outer peripheral side (the upper side) of the seal lip 33, and is scattered toward the portion in the vicinity of the slide portion S of the seal lip 33. Accordingly, it is possible to urge formation of a good lubricating oil film at the sliding portion S.

In this case, since kinetic energy of the oil O is attenuated by a buffering action of the rubber-like elastic material when the oil O comes into collision with the inclined surface 45a of the elastic protruding portion 45, a part of the oil O does not come into strong collision with the outer peripheral surface of the seal lip 33, even if a part of the oil O is rebounded onto the outer peripheral surface of the seal lip 33.

Further, in accordance with this embodiment, since the oil scattering means 4 (the elastic protruding portion 45) is not manufactured as an independent part from the sealing device main body 3 so as to be assembled, like as the first to fourth embodiments, but is formed in the sealing device main body 3 by the rubber-like elastic material continuously with the attaching portion 31, the radial portion 32, the seal lip 33 and the dust lip 34, increase of parts number and manufacturing process is not caused.

What is claimed is:

1. A sealing device comprising:
   a sealing device main body having a seal lip which is slidably brought into close contact with an outer peripheral surface of a rotating shaft;
   an oil injection port for injecting oil toward a position at an outer peripheral side from said seal lip in the sealing device main body, and
   a reinforcing ring on which the sealing device main body is integrally formed, the reinforcing ring having an approximately L-shaped cross section constituted by a cylinder portion and an inward collar portion, and
   wherein the sealing device is provided with an oil scattering part for rebounding the oil injected from said oil injection port to a location in the vicinity of a sliding portion of said seal lip so as to scatter the oil,
   wherein the oil scattering part is constituted by a plate which is integrally fitted and attached to the sealing device main body, and the plate has an axially protruding annular lip portion for guiding a direction of scatter caused by the collision of the oil injected from the oil injection port so that the oil rebounds beyond the outer peripheral side of the seal lip, and
   wherein the plate includes:
      a pressure insertion tube portion pressure fitted to an inner peripheral surface of the cylinder portion of the reinforcing ring;
      a plate main body portion extending along the inward collar portion of the reinforcing ring from an end portion of the pressure insertion tube portion on the side closest to the inward collar portion of the reinforcing ring to an inner peripheral side of the seal lip; and
      the axially protruding annular lip portion extending from an inner peripheral end of the plate main body toward the outer peripheral side of the seal lip.

2. A sealing device comprising:
   a sealing device main body having a seal lip which is slidably brought into close contact with an outer peripheral surface of a rotating shaft; and
   an oil injection port for injecting oil toward a position at an outer peripheral side from said seal lip in the sealing device main body,
   wherein the sealing device is provided with an oil scattering part for rebounding the oil injected from said oil injection port to a location in the vicinity of a sliding portion of said seal lip so as to scatter the oil, and
   wherein the oil scattering part is constituted by a plate which is integrally fitted and attached to the sealing device main body, and the plate has an acute shape adapted to cause the plate to collide with the oil injected from the oil injection port a plurality of times to rebound the oil.

3. The sealing device of claim 2 further comprising:
   a reinforcing ring on which the sealing device main body is integrally formed, the reinforcing ring having an approximately L-shaped cross section constituted by a cylinder portion and an inward collar portion, and
   wherein the plate includes:
      a pressure insertion tube portion pressure fitted to an inner peripheral surface of the cylinder portion of the reinforcing ring;
      an intermediate conical tube portion bent from an end portion at an inside space side of the pressure insertion tube portion so as to become progressively smaller in diameter toward a side opposite the inside space side; and
      an inner peripheral conical tube portion bent from a smallest diameter end portion of the intermediate conical tube portion so as to become progressively smaller in diameter toward the inside space side.

4. The sealing device of claim 3 wherein:
   the inner peripheral conical tube portion is located at a radial position to collide with the oil injected from the oil injection port; and
   an angle of incline of the inner peripheral conical tube portion is set so that the oil rebounded by the collision collides with the intermediate conical tube portion.

* * * * *